US012747612B2

(12) United States Patent
Eller et al.

(10) Patent No.: US 12,747,612 B2
(45) Date of Patent: Sep. 29, 2026

(54) DOGGING INDICATOR FOR DOOR EXIT DEVICE

(71) Applicant: ASSA ABLOY Access and Egress Hardware Group, Inc., New Haven, CT (US)

(72) Inventors: Darren C. Eller, Madison, CT (US); Andrew S. Geraci, Middlefield, CT (US); Ryan Piantek, Higganum, CT (US); Richard D. Sangster, Jr., Madison, CT (US)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 152 days.

(21) Appl. No.: 18/500,531

(22) Filed: Nov. 2, 2023

(65) Prior Publication Data

US 2024/0151066 A1 May 9, 2024

Related U.S. Application Data

(60) Provisional application No. 63/423,384, filed on Nov. 7, 2022.

(51) Int. Cl.
*E05B 41/00* (2006.01)
*E05B 65/10* (2006.01)

(52) U.S. Cl.
CPC .......... *E05B 41/00* (2013.01); *E05B 65/1053* (2013.01); *E05B 65/1093* (2013.01)

(58) Field of Classification Search
CPC ... E05B 41/00; E05B 65/1053; E05B 65/1093
See application file for complete search history.

(56) References Cited

U.S. PATENT DOCUMENTS

2016/0230423 A1* 8/2016 Lehner, Jr. .......... E05B 65/1093
2017/0292294 A1* 10/2017 Brennan ............... E05B 65/108
2020/0157851 A1* 5/2020 Fodstad .............. E05B 65/1053
2021/0404220 A1* 12/2021 Griswold ............ E05B 65/1053
2022/0139140 A1* 5/2022 Eller .................. G07C 9/00563
70/278.7

* cited by examiner

*Primary Examiner* — Mark A Williams
(74) *Attorney, Agent, or Firm* — Wolf, Greenfield & Sacks, P.C.

(57) ABSTRACT

A dogging mechanism for an exit device may include a dogging indicator configured to pivot about a pivot axis over a travel path between a first position and a second position, where the travel path comprises a midpoint between the first position and the second position. The dogging mechanism may also include a spring coupled to the dogging indicator, where the spring is configured to bias the dogging indicator towards the first position when the dogging indicator is positioned on the travel path between the midpoint and the first position, and where the spring is configured to bias the dogging indicator towards the second position when the dogging indicator is positioned on the travel path between the midpoint and the second position.

18 Claims, 13 Drawing Sheets

DOGGING INDICATOR FOR DOOR EXIT DEVICE

CROSS-REFERENCE TO RELATED APPLICATIONS

This application claims the benefit under 35 U.S.C. § 119(e) to U.S. Provisional Application Ser. No. 63/423,384, titled "DOGGING INDICATOR FOR DOOR EXIT DEVICE," filed Nov. 7, 2022, which is herein incorporated by reference in its entirety.

FIELD

Disclosed embodiments are related to dogging indicator for an exit device and related methods of use.

BACKGROUND

Conventional exit devices typically employ a dogging mechanism which may be used to prevent a latch from engaging an associated door strike. These dogging mechanisms are typically used in commercial situations where it is desirable to keep doors open for both push and pull without actuation of the latch.

SUMMARY

In some embodiments, a dogging mechanism for an exit device includes a dogging indicator configured to pivot about a pivot axis over a travel path between a first position and a second position, where the travel path includes a midpoint between the first position and the second position. The dogging mechanism also includes a dogging actuator, where the dogging actuator is configured to move between a dogged state and an undogged state, and a linkage coupled to the dogging indicator and the dogging actuator, where the linkage is configured to pivot the dogging indicator to the first position when the dogging actuator is moved into the undogged state, and where the linkage is configured to pivot the dogging indicator to the second position when the dogging actuator is moved into the dogged state. The dogging mechanism also includes a spring coupled to the dogging indicator, where the spring is configured to bias the dogging indicator towards the first position when the dogging indicator is positioned on the travel path between the midpoint and the first position, and where the spring is configured to bias the dogging indicator towards the second position when the dogging indicator is positioned on the travel path between the midpoint and the second position.

In some embodiments, a method of operating a dogging mechanism includes moving a dogging actuator from an undogged state to a dogged state, in response to moving the dogging actuator to the dogged state, pivoting a dogging indicator about a pivot axis on a travel path from a first position to a second position with a linkage coupling the dogging indicator and dogging actuator, where the travel path includes a midpoint between the first position and the second position, and biasing the dogging indicator towards the second position through a spring coupled to the dogging indicator when the dogging indicator is positioned on the travel path between the midpoint and the second position.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
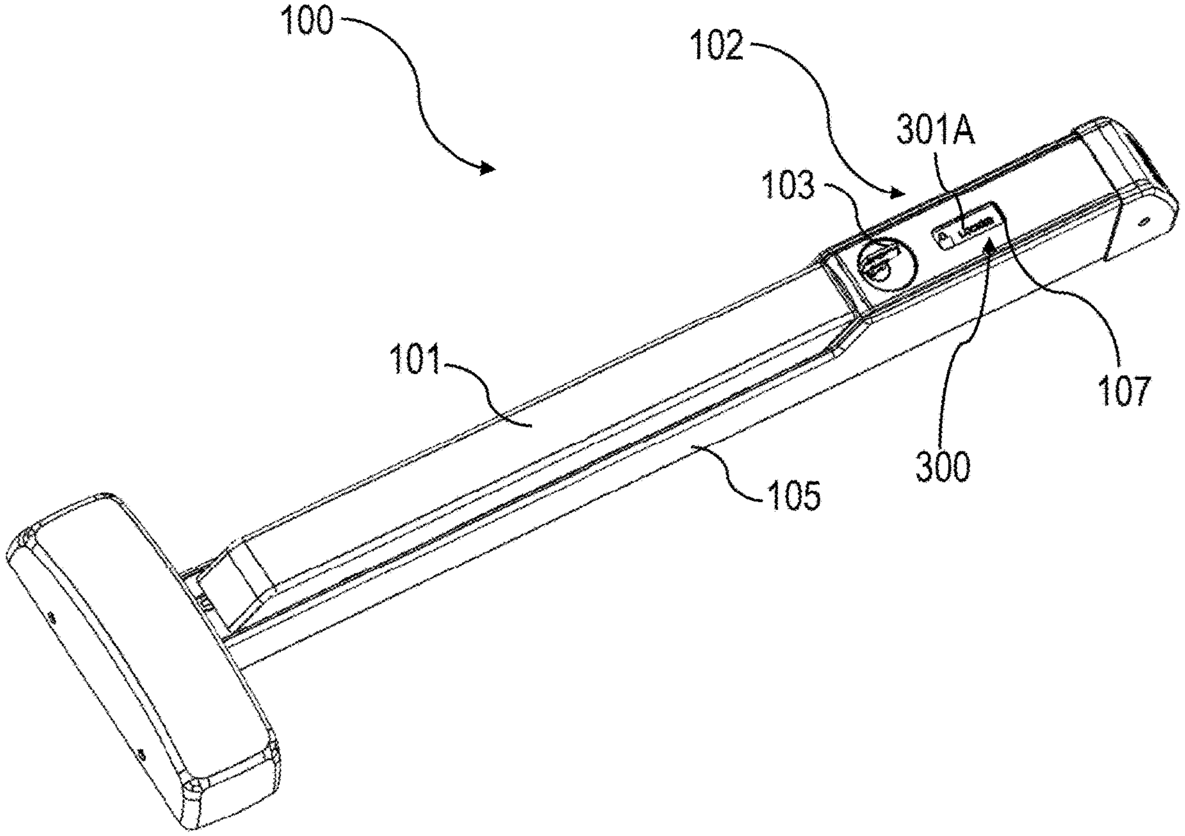
FIG. 1 is a top perspective view of one embodiment of an exit device.

Conventional exit devices may employ a dogging mechanism to dog the exit device, where the exit device is held an exit position (e.g., an unlatched position) with a push bar in a retracted position. These dogging mechanisms are typically used in situations in which it is desirable to keep doors unlatched for both push and pull without actuation of the exit device. However, in some circumstances it may be difficult to determine when the exit device is in a dogged state or an undogged state based on visual inspection alone, particularly from further distances or in low light conditions. The difficulty of determining the state of the exit device is undesirable in certain cases. For instance, in commercial settings, security guards or other individuals may have to physically check the exit devices to determine their state during the closing of a building or a lockdown due to an emergency situation, which may be time consuming and inconvenient.

The inventors have appreciated that it may be desirable for an exit device equipped with a dogging indicator to provide an indication of the state of the exit device (e.g., dogged or undogged). The dogging indicator may be configured such that the dogging status of the exit device is automatically indicated as the exit device is transitioned from the dogged state to the undogged state or from the undogged state to the dogged state. Such an indication of the state of the exit device may be desirable in a classroom setting where a teacher may desire to quickly see that that an exit device is in a locked state.

Additionally, in the event of an emergency situation (e.g., an active intruder situation), a teacher or other staff member may wish to quickly see whether the exit device is in a dogged state or an undogged state. In such emergency situations, a school may have procedures in place to maximize the safety of its occupants. For example, the school may require that the teachers place an exit device for a classroom in an undogged state and turn off the lights in the room. However, some conventional status indicators may not be visible to a teacher in low light conditions, particularly, if the teacher is positioned at a distance away from the exit device. Thus, in some instances a teacher may not be able to reliably and quickly tell whether a conventional exit device is in a dogged or undogged state when following procedures associated with an emergency situation.

In view of the above, the inventors have recognized the advantages of an exit device with a dogging mechanism including a dogging indicator, where the dogging indicator can quickly and easily provide an indication of the status (e.g., dogged state or undogged state) of the exit device. Additionally, the inventors have recognized the benefits of a dogging indicator that is clearly discernable from a distance and/or in low light conditions. Furthermore, the inventors have recognized the benefits of a dogging indicator that is reliable and easy to use.

In some embodiments, a dogging mechanism for an exit device is configured to dog or undog the exit device. For example, the dogging mechanism may be configured to hold a push bar of the exit device in a retracted position, such that a latch of the exit device is correspondingly retracted. In the dogged state, the exit device may not restrict an associated door, such that the door may be push or pulled open without being inhibited by the exit device. In the undogged state, the dogging mechanism may not interfere with the normal operation of the exit device. Accordingly, in the undogged state the exit device may be configured to latch a door closed, such that a push bar has to be retracted or a handle has to be turned in order to retract the latch and open the door. A dogging mechanism according to exemplary embodiments described herein may include a dogging actuator. The dogging actuator may be configured to receive input from a user via a key, a tool (e.g., an Allen key), or other input from a local user (e.g., at a user interface such as a switch, button, etc.) or remote user (e.g., at a central control panel, computer, or remote device). The user input may be employed to transition the dogging actuator between the dogged state and undogged state to correspondingly dog or undog the exit device, respectively. In some embodiments, the dogging actuator may be coupled to a dogging linkage that is configured to transfer motion of the dogging actuator to other components of the dogging mechanism. For example, the dogging linkage may be coupled to a dogging indicator and may be configured to move the dogging indicator between a first position and a second position. While a single linkage may be employed in exemplary embodiments herein, in other embodiments more than one linkage may be employed, as the present disclosure is not so limited.

In some embodiments, a dogging mechanism includes a dogging indicator. The dogging indicator is configured to indicate a state of the dogging actuator. In some embodiments, the dogging indicator may be configured to indicate a state of the dogging actuator on a push bar housing of an exit device, such that any person on a secure side of a door (e.g., a side on which the push bar is mounted) may quickly see the state of the dogging actuator. In some embodiments, the dogging indicator may be configured to pivot on a pivot axis over a travel path between a first position and a second position, where the travel path includes a midpoint between the first position and the second position. In some embodiments, the first position and second position may be end stops on the travel path (e.g., the first position and second position may represent end of travel of the dogging indicator on the travel path). The first position may be associated with displaying a first state of the dogging actuator (e.g., dogged) and the second position may be associated with displaying a second state of the dogging actuator (e.g., undogged). The dogging mechanism may include a spring configured to bias the dogging indicator to either the first position or the second position depending on the location of the dogging indicator on the travel path.

In some embodiments, the dogging indicator may have two faces, where the two faces are adjacent to one another and disposed at an angle relative to one another. The two faces may extend in a direction parallel to the pivot axis. A first face of the two faces may have a first marking indicating a first state of the dogging actuator. Accordingly, when the first face is displayed, the dogging indicator may be indicating the first state of the dogging actuator. A second face of the two faces may have a second marking indicating a second state of the dogging actuator. A marking may be an icon, text, color, or other symbol that communications information to a viewer of the marking. Accordingly, when the second face is displayed, the dogging indicator may be indicating a second state of the dogging actuator. In some embodiments, the dogging indicator may be disposed in a housing where the housing has a slot that is configured to show one face of the two faces through the slot (e.g., either the first face or the second face). For example, when the dogging indicator is in the first position, the first face may be aligned with the slot so that the first face is displayed through the slot. Correspondingly, when the dogging indicator is in the second position the second face may be aligned with the slot so that the second face is displayed through the slot.

In some embodiments, a dogging mechanism may include a spring attached to the dogging indicator, where the spring is configured to bias the dogging indicator towards either a first position or a second position depending on the position of the dogging indicator on a travel path. In some embodiments, the spring may be configured to bias the dogging indicator to the first position when the dogging indicator is disposed between a midpoint of the travel path and the first position. Accordingly, at any position of the dogging indicator between the midpoint and first position, the dogging indicator will be biased and moved by the spring to the first position. Similarly, the spring may be configured to bias the dogging indicator towards the second position when the dogging indicator is disposed between the midpoint of the travel path and the second position. In some embodiments, the spring may be attached to a projection of the dogging indicator extending parallel to the pivot axis. In some embodiments, the spring may extend along a spring axis perpendicular to the pivot axis. As the dogging indicator moves between the first position and the second position, the spring axis is configured to cross the pivot axis. In some embodiments, the spring axis may bisect the dogging indicator. In some embodiments, the spring may be a tension spring. The spring arrangements for a dogging indicator according to exemplary embodiments herein may allow the dogging indicator to reliably appear in one of two states regardless of the variations in tolerance stack, wear on a dogging mechanism, etc. Accordingly, the dogging indicator may be easier to view and less likely to display inconsistent or hard to view indications over the lifespan of the exit device.

In some cases, the inventors have appreciated the benefits of illuminating a dogging indicator to improve a visibility of the dogging indicator in certain environmental conditions (e.g., low lighting, smoke, etc.). In some embodiments, a dogging mechanism may also include a light source configured to illuminate a dogging indicator. The dogging mechanism may include a switch configured to activate the light source when the dogging indicator is in the first position. For example, the switch may be a microswitch that is activated when the dogging indicator is in the first position (e.g., the dogging indicator or an associated component may contact the microswitch). In some embodiments, the switch may be configured to deactivate (e.g., turn off) the light source when the dogging indicator is in the second position or any position other than the first position. According to such embodiments, the light source may only be activated and used to actively illuminate the dogging indicator when the dogging indicator is indicating a particular state. For example, it may be desirable to illuminate an indication for when a dogging actuator is dogged, but not when the dogging actuator is undogged. Alternatively, in some embodiments the switch may be configured to change the color of the light source when the dogging indicator is in the first position and change to an alternate color when the dogging indicator is in the second position. For example, when a dogging actuator is undogged the light source may illuminate the dogging indicator with a green light, and when the dogging actuator is dogged the light source maty illuminate the dogging indicator with a red light. Such a colored indication may provide a distinct appearance to the exit device that is quickly perceivable to a person viewing the exit device.

In some cases, the inventors have appreciated the benefits of a dogging indicator configured to be employed in a variety of exit devices that may have different shapes, constructions, or aesthetic features. In some embodiments, a rail slot formed in an exit device rail may have a different width, length, thickness, or curvature. However, an underlying dogging indicator housing slot may have a constant width, length, and thickness as the dogging indicator is configured to universal use in different exit devices. Accordingly, the inventors have appreciated the benefits of an interchangeable lens for a dogging indicator that couples to the dogging indicator housing slot and is configured for the particular geometry of an exit device rail slot. The lens may allow a dogging indicator according to exemplary embodiments herein to be used with a variety of exit device rails having slots of differing geometries.

In some cases, the inventors have appreciated the benefits of a dogging indicator that is employed in variety of applications for which specific markings on the dogging indicator may be desirable or required. For example, in some cases it may be desirable for two faces of a dogging indicator to display "LOCKED" and "UNLOCKED". In some other cases, it may be desirable for two faces of a dogging indicator to display "DOGGED" and "UNDOGGED". As yet another example, in some embodiments it may be desirable for two faces of a dogging indicator to have different colors for certain applications or aesthetic preferences. In some cases, it may be desirable to have faces of a dogging indicator be red and green. In other cases, it may be desirable to have faces of a dogging indicator be monochromatic (e.g., black and white). Additionally, the inventors have appreciated that in some instances it may be desirable to install a dogging indicator in different orientations. For example, in a left-hand door a dogging indicator may be installed in an exit device in a first orientation. In a right-hand door a dogging indicator may be installed in a second orientation. In some embodiments, the second orientation may be a 180-degree rotation about an axis perpendicular to the door. In such instances, the change in orientation may invert the face of a dogging indicator displayed for a given state of a dogging mechanism. For example, a dogging indicator configured for the first orientation may display an incorrect status when in the second orientation. In view of the foregoing, the inventors have appreciated the benefits of a dogging indicator including interchangeable label plates configured to be attached to faces of a dogging indicator. In some embodiments, the label plates may be removable. Such an arrangement may allow an end user or installer to display different markings on a dogging indicator as desired. Additionally, such an arrangement may allow markings to be correctly installed based on an orientation of the dogging indicator within an exit device relative to a door.

While exemplary embodiments herein are described with reference to a manual dogging actuator, in some embodiments a dogging actuator may be automated or semi-automated and controlled with one or more remotely controllable actuators. For example, a dogging actuator may include a motor, stepper motor, linear actuator, solenoid, and/or any other suitable electromechanical actuator that may be employed to transition a dogging mechanism between a dogged state and an undogged state. In some embodiments, an electrified dogging actuator may also be configured to receive manual input from a user (e.g., via a key, button, switch, etc.) as a manual override of the electrified components. Any combination of electrified and manual actuators may be employed in dogging mechanisms described herein, and a dogging indicator may be employed with any manual or electrified dogging mechanism, as the present disclosure is not so limited.

Exit devices including dogging mechanisms according to exemplary embodiments herein may be employed in variety of installations, including in commercial settings. The dogging indicator of exemplary embodiments herein may enable for quick security checks of doors by a security guard or another employee locking up a building or store. Commercial settings may include, but are not limited to, office buildings, malls, warehouses, factories, and airports. Dogging indicators of exemplary embodiments herein may also be useful in other settings where quick determination of status of an exit device is important, such as schools, government buildings, and prisons. In some embodiments, a dogging mechanism may be employed in any desirable location, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a top perspective view of one embodiment of an exit device 100. As shown in FIG. 1, the exit device includes a push bar 101 and a rail 105. The push bar 101 is configured to move into and out of the rail 105 between an extended position and a retracted position. The exit device may be in an exit position when the push bar 101 is in a retracted position, as retraction of the push bar may retract a corresponding latch (not shown). In the state shown in FIG. 1, the push bar 101 is in the extended position and the exit device is therefore in a latched position as the corresponding latch may be extended. During normal operation (e.g., when the exit device is undogged), a user may push on push bar 101 to retract the push bar 101 from the extended position into the retracted position to move the exit device into the exit position so that the user can open the associated door. Movement of the push bar 101 from the extended position to the retracted position may correspondingly move a latch of the exit device 100 from a latched position to an unlatched position. When the push bar 101 is released, the push bar may then default back to the extended position (e.g., the push bar may be biased to the extended position by one or more push bar springs or lever springs). For example, the exit device 100 may include a lever spring (for example, see lever spring 207 in FIG. 2) configured to bias the push bar 101 to the extended position.

According to the embodiment of FIG. 1, the exit device includes a dogging mechanism 102 configured to dog or undog the exit device 100. That is, the exit device 100 may be changed to a dogged state in which the exit device 100 is held in the exit position until manually released. In the dogged state, the push bar 101 may be held in the retracted position (and correspondingly a latch may be held in an unlatched position) such that a user may be able to open a door associated with the exit device 100 without actuating the push bar 101. A user may be able to transition the exit device 100 between the dogged state and the undogged state via a key 103, which will be explained in further detail below with reference to FIGS. 3A-4B. The key 103 may be employed as an interface to a dogging actuator of a dogging mechanism which is movable to dog or undog the exit device 100. According to the embodiment of FIG. 1, the dogged state or undogged state of the exit device 100 is indicated through a dogging indicator 300. The dogging indicator includes two faces to indicate the exit device 100 state. As shown in FIG. 1, a first face 301A of the two faces is shown through a rail slot 107 formed in the rail 105. The functionality of the dogging indicator 300 will be discussed further below with reference to FIGS. 3A-8C.

Figure 2:
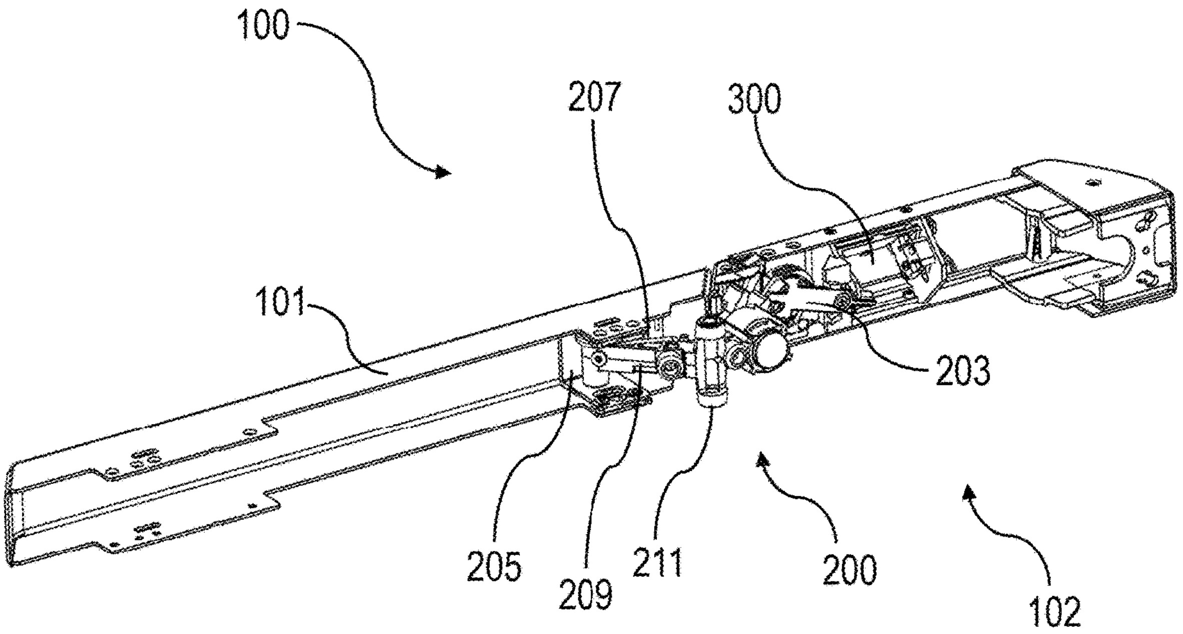
FIG. 2 is a bottom perspective view of the exit device of FIG. 1 with a rail partially removed.

FIG. 2 is a bottom perspective view of the exit device 100 of FIG. 1 with the rail 105 partially removed for clarity. As shown in FIG. 2, the exit device 100 includes a dogging mechanism 102. The dogging mechanism 102 includes a dogging actuator 200 and dogging indicator 300, where the dogging actuator 200 is configured to move between a dogged state and an undogged state to correspondingly dog or undog the exit device 100. That is, movement of the dogging actuator 200 between the dogged state and the undogged state is configured to move the exit device 100 between its dogged state and undogged state. The dogging actuator 200 includes a push bar bracket 205 which is coupled to the push bar 101. While in the dogged state, the dogging actuator 200 is configured to hold the push bar 101 in an exit position. As show in FIG. 2, the dogging mechanism includes a linkage 203 that is coupled to the dogging indicator 300 and dogging actuator 200. The linkage 203 is configured to pivot the dogging indicator 300 between a first position when the dogging mechanism is moved into the undogged state and a second position when the dogging mechanism is moved into the dogged state. Accordingly, the dogging indicator 300 will indicate either the dogged state or the undogged state of the dogging actuator based on the position the dogging indicator is moved to by the linkage 203.

As shown in FIG. 2, in some embodiments the push bar 101 may be coupled to the rail with one or more levers 209. A single lever is shown in FIG. 2 for clarity. Each lever may include a lever hinge 211 about which the lever rotates. In such embodiments, the push bar 101 may move in an arc between a retracted position and an extended position based on the rotation of the lever 209. In some embodiments, the lever may include a lever spring 207 configured to bias the push bar to the extended position. In the embodiment of FIG. 2, the lever spring 207 may be a torsion spring. Any linkage for the push bar 101 may be employed to allow the push bar to move between an extended and retracted position, as the present disclosure is not so limited. Likewise, any biasing arrangement for the push bar may be employed, including other types of springs such as compression springs and tension springs, as the present disclosure is not so limited.

Figure 3A:
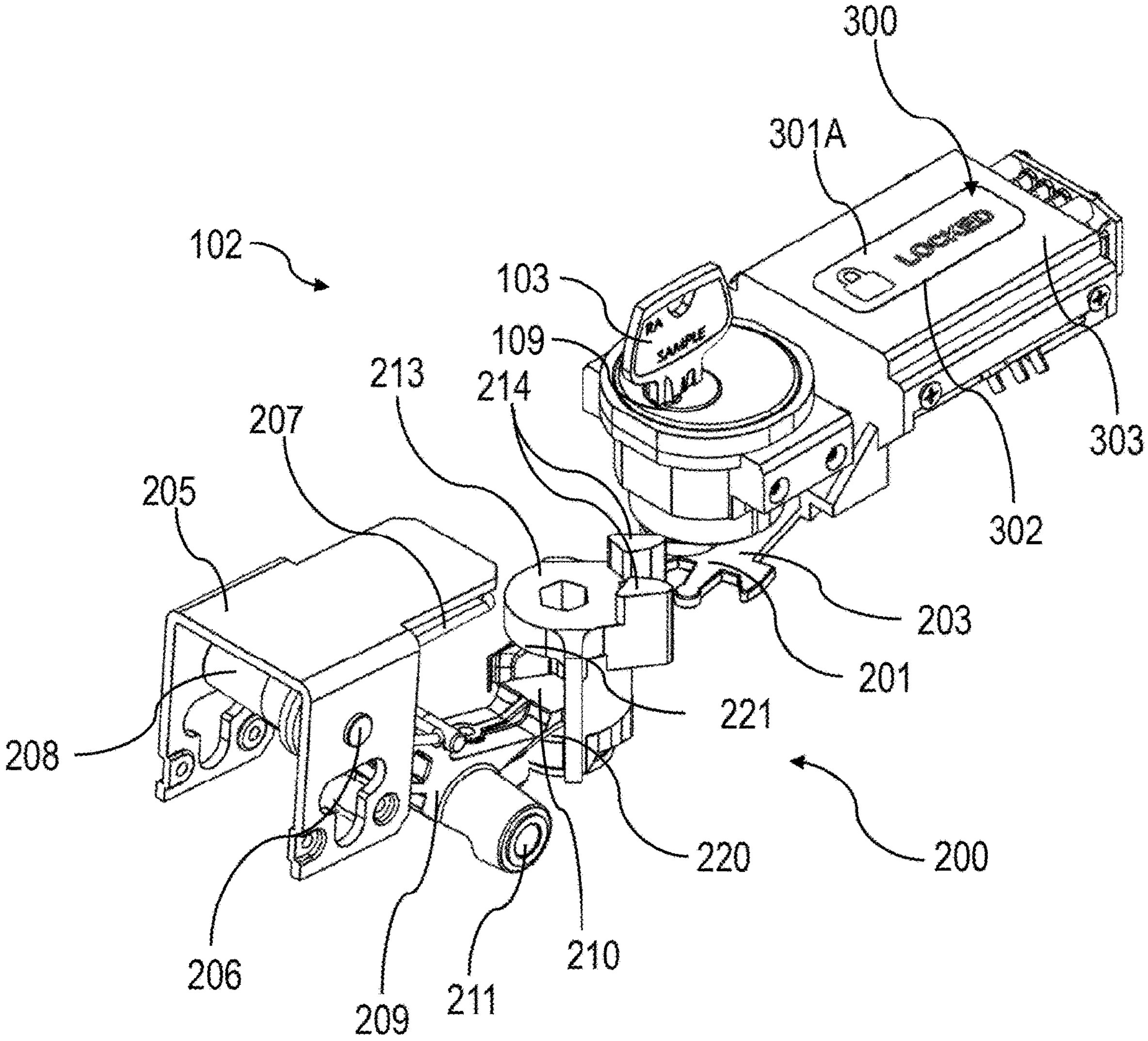
FIG. 3A is a perspective view of a dogging mechanism of the exit device of FIG. 2 in an undogged state.

FIG. 3A is a perspective view of the dogging mechanism 102 of the exit device of FIG. 2 including a dogging actuator 200 in the undogged state. In some embodiments as shown in FIG. 3A, the dogging mechanism 102 includes a housing 303 with a slot 302. The dogging indicator 300 is disposed in the housing 303, where the slot 302 is configured to show a single face of the dogging indicator 300. In some embodiments, the dogging indicator may include two faces. In the example of FIG. 3A a first face 301A of the dogging indicator 300 is shown through the slot 302. The first face 301A may correspond to the dogging actuator 200 being in the undogged state, which may further correspond to an exit device being in a latched position. In the embodiment of FIG. 3A, the first face 301A includes a marking including the text "locked" and a lock symbol indicative of this state.

As shown in the embodiment of FIG. 3A, as associated exit device includes a push bar bracket 205 and a lever 209. The push bar bracket 205 is coupled to the lever 209 and pivots around a lever axle 208 and a bracket pivot pin 206. The lever is configured to rotate about a lever hinge, correspondingly moving the push bar bracket 205 in an arc. A lever spring 207, configured in the instant embodiment as a torsion spring, biases lever 209 to rotate in a first direction (e.g., clockwise) to corresponding bias the push bar to an extended position. The lever hinge 211 may be fixed to a corresponding rail.

In the embodiment of FIG. 3A, the dogging actuator 200 is operated by a key 103 which may rotate a lock cylinder 109 to move the dogging actuator 200 between the dogged state and the undogged state. In the embodiment of FIG. 3A, the dogging actuator 200 includes an actuator cylinder 213. The actuator cylinder 213 is configured to rotate based on the state of the dogging actuator. The actuator cylinder 213 includes cylinder projections 214. The actuator cylinder 213 also includes a cylinder floor 220 and a cylinder roof 221. A cylinder engagement end portion 210 of the lever 209 coupling the push bar to the rail is received by the actuator cylinder 213 between the cylinder floor 220 and the cylinder roof 221. In the position shown in FIG. 3A (corresponding to the dogging actuator being in the dogged state), the actuator cylinder 213 is configured to allow free rotation of the lever 209 such that the push bar may move freely between the retracted and extended positions. As will be discussed further with reference to FIGS. 4A-4B, the actuator cylinder 213 may be rotated when the dogging actuator is moved to the dogged state to restrict the rotation of the lever 209 by capturing the cylinder engagement end portion 210, thereby holding the associated push bar in the retracted position.

According to the state shown in FIG. 3A, the dogging actuator 200 is in the undogged state and the associated push bar may be in extended state. The push bar may be depressed and retracted, thereby correspondingly moving the push bar bracket 205 downwards with the push bar 101. As the push bar bracket 205 is moved downwardly (e.g., further into a push bar rail) the lever 209 may be rotated in a second direction (e.g., counterclockwise) against the biasing force of the lever spring 207. The lever 209 pivots around the lever hinge 211 and moves the push bar bracket 205 (and the corresponding push bar) in an arc from the extended position to the retracted position. The movement of the push bar 101 to the retracted position raises the cylinder engagement end portion 210 of the lever 209 upwards towards a cylinder roof 221 of the actuator cylinder 213. When the push bar is released while in the retracted position and the dogging actuator 200 is in the undogged state, the lever spring 207 biases the lever 209 to rotate in the first direction (e.g., clockwise) and therefore biases the push bar bracket 205 and corresponding push bar back toward the extended position.

As shown in FIG. 3A, the dogging mechanism includes a linkage 203 configured to couple the dogging actuator 200 including the actuator cylinder 213 to the dogging indicator 300. In the present embodiment, the cylinder projections 214 are configured to engage a trident end portion 201 of the linkage 203 to allow rotational motion to be transmitted between the linkage 203 and the actuator cylinder 213. As shown more clearly in FIG. 3B, the trident end portion 201, having three protrusions, may reliably engage and transfer force to the actuator cylinder 213 without binding. In other embodiments, other couplings between the linkage and the actuator cylinder may be employed, as the present disclosure is not so limited. Rotation of the actuator cylinder 213 may be transferred to the linkage 203 and employed to move the dogging indicator 300 between a first position and a second position to display the corresponding undogged or dogged state of the dogging actuator 200.

Figure 3B:
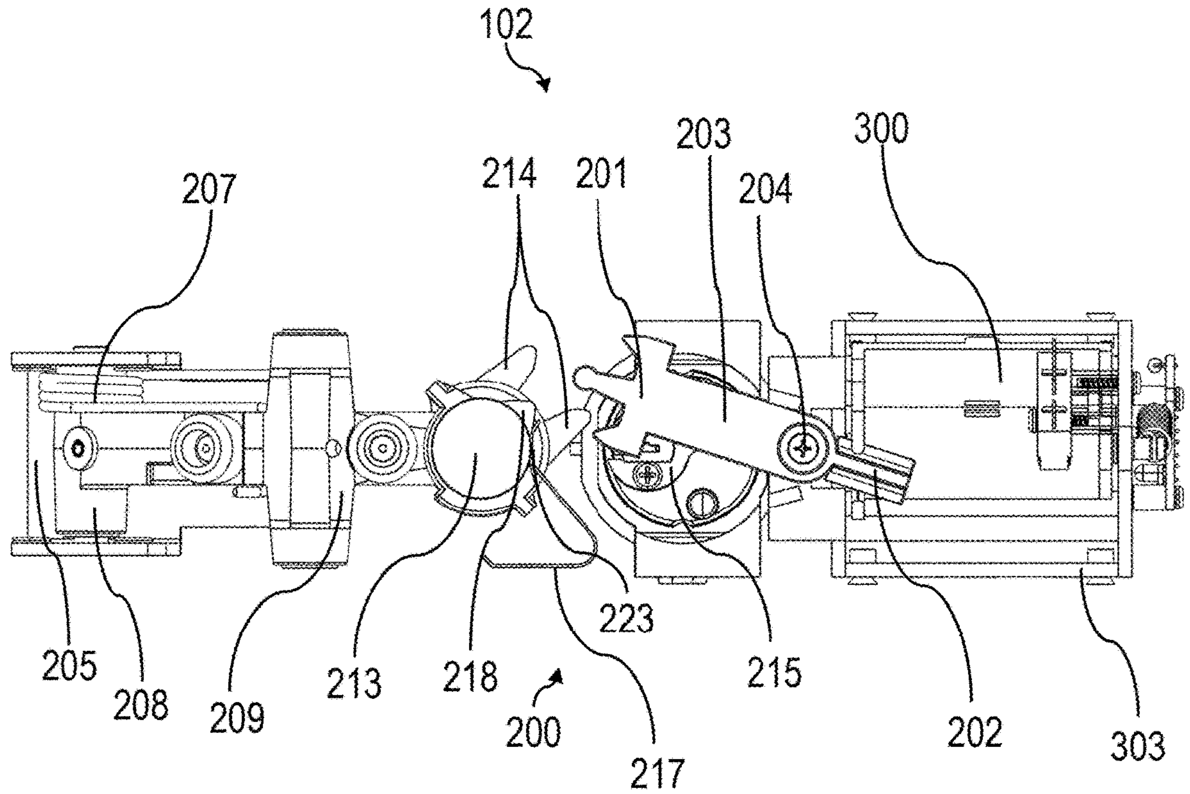
FIG. 3B is a bottom plan view of the dogging mechanism of FIG. 3A in the undogged state.

FIG. 3B is a bottom plan view of the dogging mechanism 102 of FIG. 3A. In the state of FIG. 3B the dogging actuator 200 of the dogging mechanism is still in the undogged state. As shown in FIG. 3B, the dogging actuator 200 includes a lock cylinder tailpiece 215 that is rotatable by a key. The tailpiece 215 is configured to engage the cylinder projections 214 of the actuator cylinder 213 to rotate the actuator cylinder as the dogging actuator transitions between the dogged state and undogged state. To move the dogging actuator 200 into the dogged state from the undogged state shown in FIG. 3B, a key (for example, see FIG. 3A) rotates tailpiece 215 in a first direction (e.g., counterclockwise in the view shown in FIG. 3A). The tailpiece 215 includes a tailpiece projection 216 shown in FIG. 4A. The tailpiece projection 216 engages the cylinder projections 214 as the tailpiece 215 rotates, correspondingly rotating the actuator cylinder 213 in a second direction opposite the first (e.g., clockwise) from a first cylinder position to a second cylinder position as the cylinder projections 214 are pushed by the tailpiece projection 216. The actuator cylinder 213 is in the first cylinder position when the dogging actuator 200 is in the undogged state and is in the second cylinder position when the dogging actuator is in the dogged state. As will be discussed further with reference to FIGS. 4A-4B, when the actuator cylinder 213 is in the second cylinder position the actuator cylinder may restrict the movement of the lever 209 to keep an associated push bar in a retracted position.

As shown in FIG. 3B, the trident end portion 201 of the linkage 203 is more clearly shown with three protrusions. The movement of the cylinder projections 214 under engagement from the tailpiece 215 causes the cylinder projections 214 to engage the linkage 203. As the actuator cylinder 213 rotates to the second cylinder position in the second direction, the linkage 203 is rotated around a linkage pivot point 204 which may be fixed to the housing 303. That is, the trident end portion 201 of the linkage is moved downward relative to the page to rotate the linkage 203 in the first direction (e.g., counterclockwise). As shown in FIG. 3B, the linkage 203 includes an indicator end portion 202 that is coupled to the dogging indicator 300. The rotation of the linkage from engagement by the cylinder projections in turn pivots the dogging indicator 300 via the indicator end portion 202 from the first position to the second position. According to the embodiment of FIGS. 3A-3B, the movement of the dogging indicator from the first position to the second position may cause a second face 301B of the dogging indicator 300 to be shown through the housing slot 302 and a corresponding rail slot (for example, see rail slot 107 in FIG. 1).

In some embodiments as shown in FIG. 3B, the dogging actuator 200 includes a cylinder spring 217. The cylinder spring 217 abuts the actuator cylinder 213 and may be fixed to a rail of an exit device (for example, see FIG. 1). When the actuator cylinder 213 rotates due to the dogging actuator moving between the undogged state and the dogged state, the cylinder spring 217 acts as an over center mechanism to bias the actuator cylinder 213 to either the first cylinder position or the second cylinder position. The cylinder spring 217 is elastically deformed by a spring protrusion 218 as the actuator cylinder 213 rotates past a distal end 223 of the cylinder spring 217. As the spring protrusion 218 passes the distal end 223 of the cylinder spring, the cylinder spring 217 returns to its initial position. As the cylinder spring 217 returns to its initial position, the cylinder spring applies force urging the actuator cylinder 213 in the direction of rotation of the actuator cylinder until the actuator cylinder is in either the first cylinder position or the second cylinder position. When the actuator cylinder 213 is initially moved from one of the first cylinder position and the second cylinder position, the cylinder spring 217 resists rotation from the actuator cylinder as the cylinder spring is deformed. In this manner, the cylinder spring 217 may operate to set the actuator cylinder 213 in either the first cylinder position or the second cylinder position (e.g., as a detent). The cylinder spring may also encourage the actuator cylinder to continue rotating to one of the first cylinder position and the second cylinder position once the actuator cylinder is past a midpoint of travel (established by the spring protrusion 218). As a result, the operation of the dogging actuator 200 is more reliable and less subject to error due to tolerance stacks or wear if the tailpiece 215 does not fully move the actuator cylinder into the desired position.

Figure 4A:
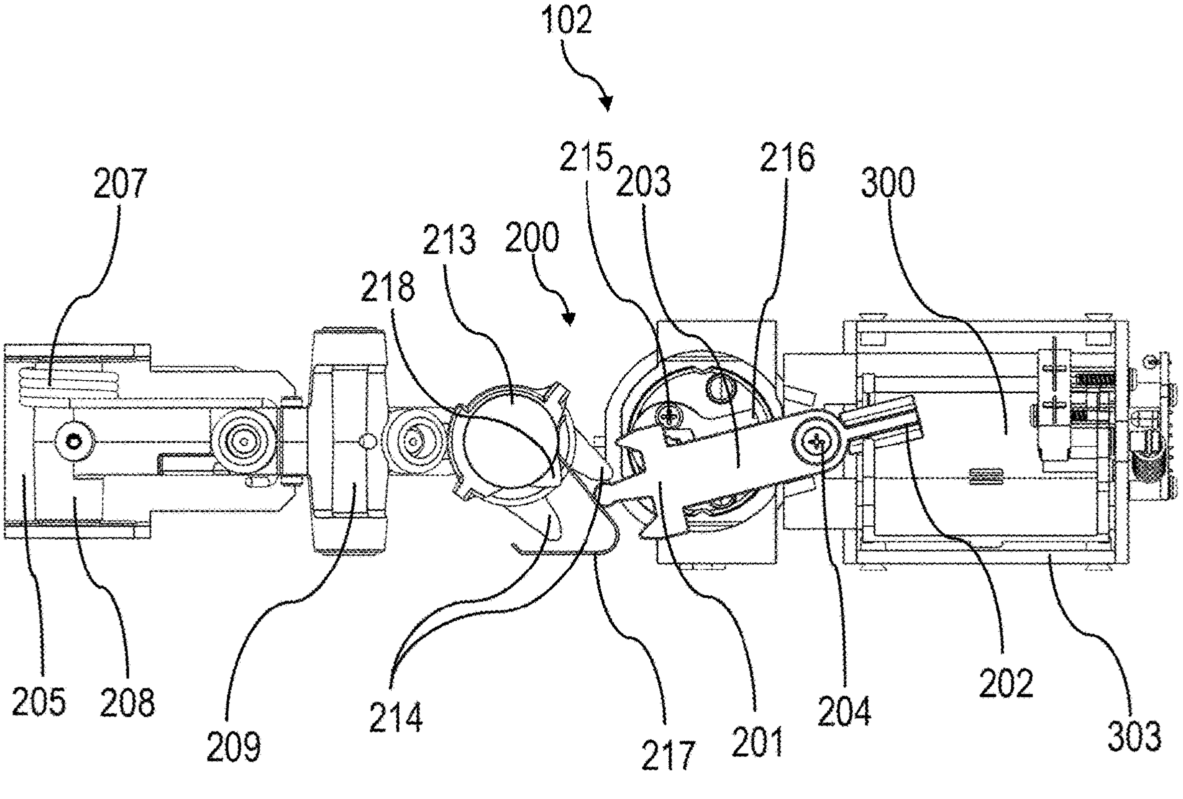
FIG. 4A is a bottom plan view of a dogging mechanism of FIG. 3A in a dogged state.

FIG. 4A is a bottom plan view of the dogging mechanism 102 in the dogged state of the exit device 100 of FIG. 2. As seen in FIG. 4A, the dogging actuator 200 is in the dogged state and correspondingly the actuator cylinder 213 is in the second cylinder position. Compared to the state of FIG. 3B, the actuator cylinder 213 has rotated clockwise to the second cylinder position. Correspondingly, the cylinder projections 214 have engaged the linkage 203 and rotated the linkage counterclockwise about the linkage pivot point 204. As a result, the indicator end portion 202 of the linkage 203 has pivoted the dogging indicator 300 about a pivot axis from the first position of FIGS. 3A-3B to a second position. Correspondingly, a second face of the dogging indicator 300 may be shown through a slot of the housing 303. The second face may include a marking relating to the dogging actuator 200 being in a dogged state, an associated push bar being in a retracted position, and the associated exit device therefore being unlatched.

To move the dogging actuator 200 into the undogged state from the state shown in FIG. 4A, a key (for example, see FIG. 4B) rotates the tailpiece 215 in the second direction (e.g., clockwise). The tailpiece projection 216 engages the cylinder projections 214 as the tailpiece 215 rotates, rotating the actuator cylinder 213 in the first direction opposite the second direction (e.g., counterclockwise) to the second cylinder position as the cylinder projections 214 are pushed by the tailpiece. The movement of the cylinder projections 214 additionally rotates the linkage 203 in the second direction (e.g., clockwise) around the linkage pivot point 204 through the engagement of the trident end portion 201 of the linkage with the cylinder projections 214. The movement of the linkage 203 in turn pivots the dogging indicator 300 from the second position to the first position through the coupling of the indicator end portion 202 of the linkage to the dogging indicator 300.

Figure 4B:
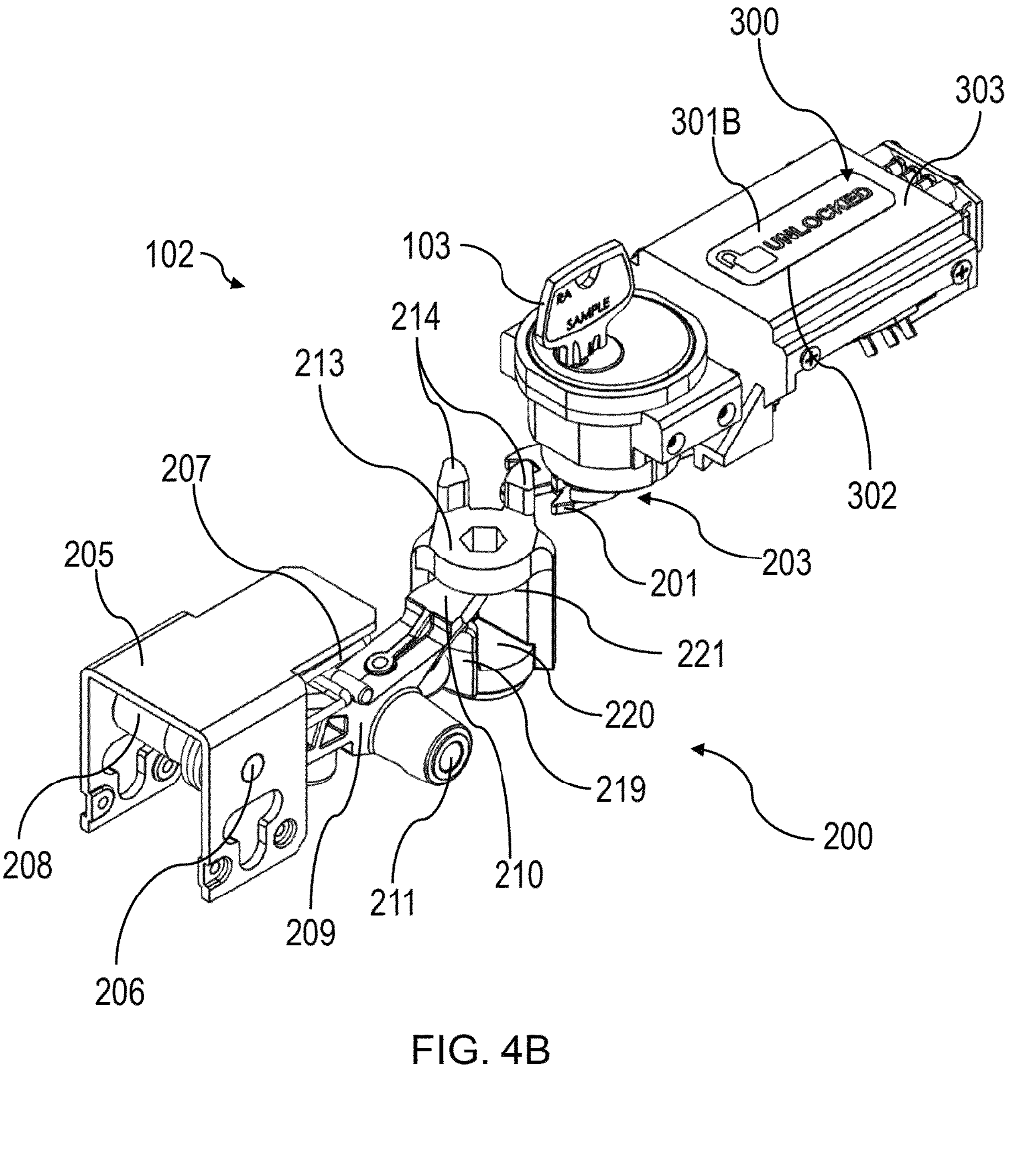
FIG. 4B is a perspective view of the dogging mechanism of FIG. 4A in the dogged state.

FIG. 4B is a perspective view of the dogging mechanism 102 of FIG. 4A with the dogging actuator 200 in the dogged state. As discussed previously, while the dogging actuator 200 is in the dogged state, the dogging actuator 200 is configured to hold an associated push bar in the retracted position. According to the embodiment of FIG. 4B, in order to move the dogging actuator 200 into the dogged state, the push bar must first be moved to and held in the retracted position. As shown in FIG. 4B, the actuator cylinder 213 includes a cylinder lip 219 that is raised relative to the cylinder floor 220. Accordingly, the push bar may be moved to the retracted position to rotate the lever 209 to lift the cylinder engagement end portion 210 away from the cylinder floor 220 of the actuator cylinder 213. Once the cylinder engagement end portion 210 is lifted to clear the cylinder lip 219, the actuator cylinder 213 may be rotated to the second cylinder position so that the cylinder lip 219 moves underneath the cylinder engagement end portion 210. The engagement of the cylinder engagement end portion 210 and the cylinder lip 219 prevents the lever 209 from rotating to return the push bar to the extended position, thereby holding the push bar in the retracted position against the biasing force of the lever spring 207 or any other push bar spring.

Figure 5:
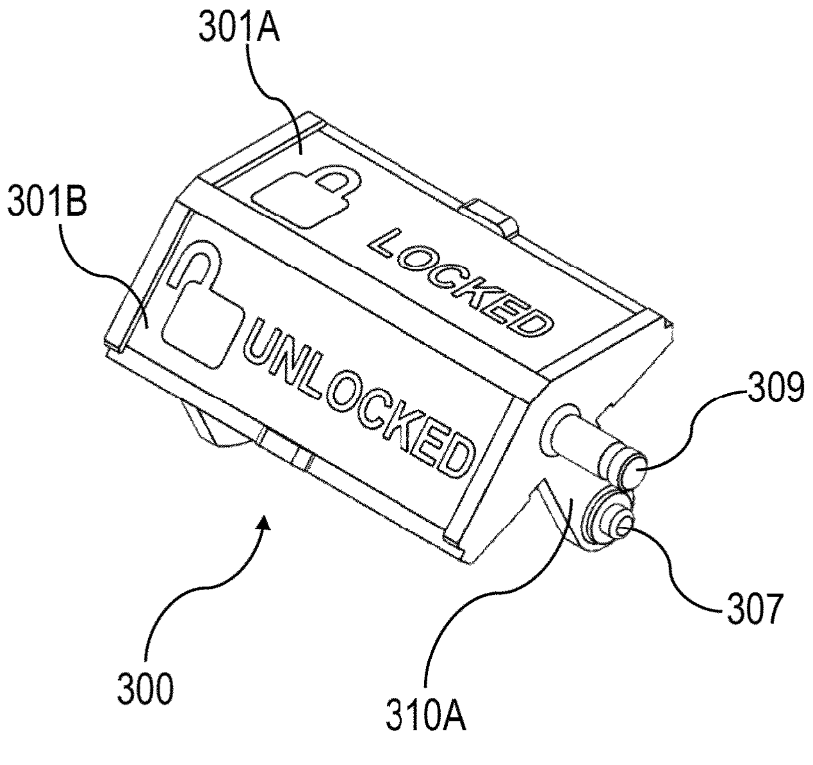
FIG. 5 is a perspective view of one embodiment of a dogging indicator.

FIG. 5 is a perspective view of an embodiment of a dogging indicator 300. As shown in FIG. 5, the dogging indicator 300 includes two faces: a first face 301A and a second face 301B. The first face 301A and the second face 301B are adjacent to one another. Additionally, the first face 301A and the second face 301B and disposed at an angle relative to one another. In the embodiment of FIG. 5, the angle between the first face and second face may be an obtuse angle of approximately 160 degrees. In other embodiments, any angle may be employed, including, but not limited to 120 degrees, 135 degrees, and 170 degrees. According to the embodiment of FIG. 5, the dogging indicator 300 has a first arm 310A and a second arm (see second arm 310B in FIG. 6) that provide a hinge 307 and an associate pivot axis about which the dogging indicator 300 pivots. The dogging indicator 300 further includes an indicator spring projection 309. As will be discussed further with reference to the embodiment of FIG. 6, the dogging indicator may be moved between a first position and a second position at least partially due to biasing force received from a spring. The spring may apply force to the dogging indicator at the indicator spring projection 309. As the dogging indicator pivots between the first position and the second position, either the first face 301A or the second face 301B may be displayed through an exit device to indicate a state of the exit device (e.g., dogged or undogged).

Figure 6:
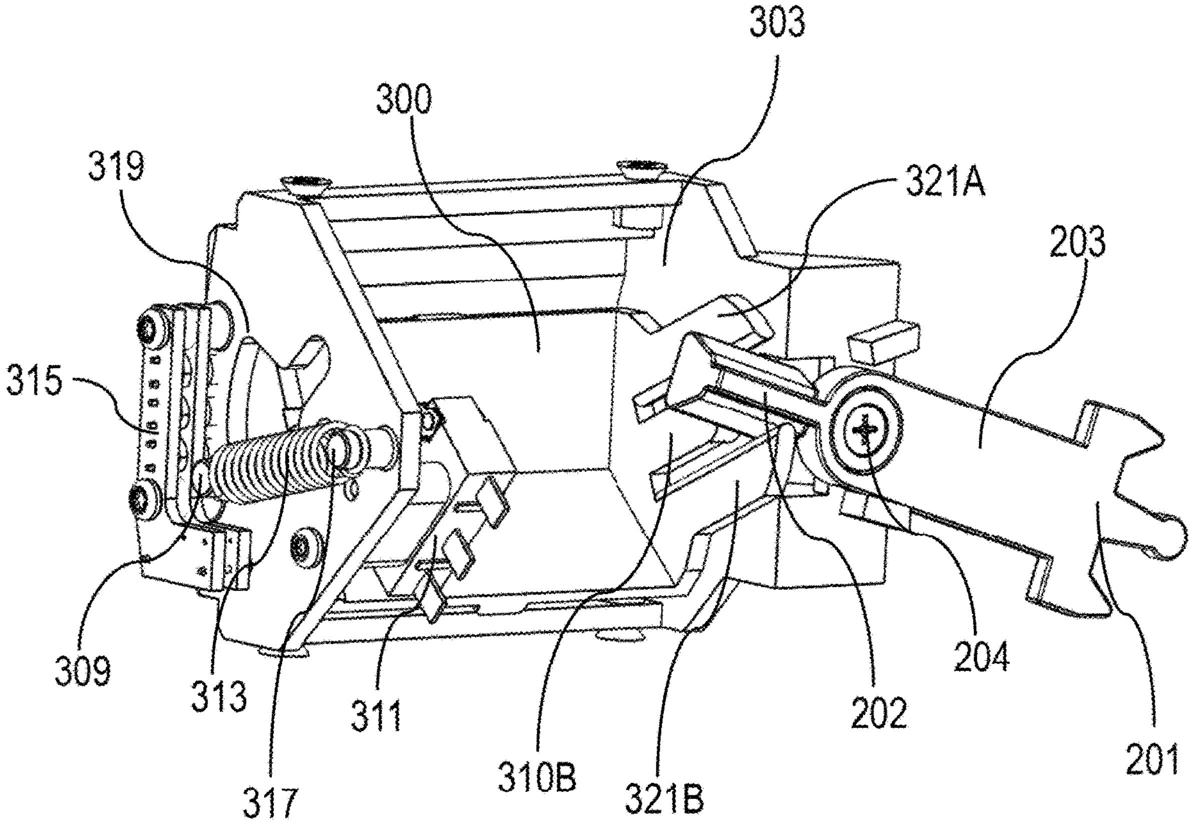
FIG. 6 is a perspective view of an embodiment of a dogging indicator, a housing, and a linkage of a dogging mechanism.

FIG. 6 is a perspective view of a dogging indicator 300, housing 303, and linkage 203 of a dogging mechanism. The dogging indicator 300 includes a first arm and a second arm 310B that provide a hinge establishing a pivot axis for the dogging indicator. The dogging indicator 300 also includes a first linkage projection 321A and a second linkage projection 321B. An indicator end portion 202 of the linkage 203 is captured between the first linkage projection 321A and the second linkage projection 321B such that rotation of the linkage is able to pivot the dogging indicator 300. That is, as the linkage 203 rotates (e.g., in response to rotation of a dogging actuator) the dogging indicator will correspondingly pivot between a first position and a second position. Accordingly, the dogging indicator may indicate a state of a dogging actuator and associated exit device as the dogging indicator is pivoted in response to a change in state of a dogging actuator. In other embodiments, other couplings between the linkage and the dogging indicator may be employed, as the present disclosure is not so limited.

According to the embodiment of FIG. 6, the housing 303 includes an indicator spring 313 that is attached to the indicator spring projection 309 and a housing spring projection 317. In the embodiment of FIG. 6, the indicator spring projection 309 extends out through a housing spring slot 319 which allows the dogging indicator 300 to pivot without interference from the housing. According to the embodiment of FIG. 6 the spring may be a tension spring configured to apply biasing force to the indicator spring projection 309 toward the housing spring projection 317. The biasing force may be employed to selectively bias the dogging indicator 300 to one of the first position and the second position based on the position of the dogging indicator. Operation of a spring and a dogging indicator will be discussed further with reference to the examples of FIGS. 7-8C.

In some embodiments as shown in FIG. 6, a dogging mechanism may include a light source 315 configured to illuminate the dogging indicator. The illumination may be useful to improve the visibility of the dogging indicator at a glance. In some embodiments, the light source may include one or more LEDs oriented in a direction parallel to a plane of a face of the dogging indicator 300 aligned with a housing slot formed in the housing 303. In some embodiments as shown in FIG. 6, the light source 315 is attached to the housing 303. The dogging indicator also includes a switch 311 attached to the housing 303. The switch 311 is configured to activate the light source 315 when the dogging indicator 300 is in the first position. For example, the dogging indicator 300 is configured to contact the switch 311 to complete a circuit and activate the light source 315. In some embodiments, the switch 311 is configured to turn off the light source 315 when the dogging indicator 300 is in the second position. For example, when the dogging indicator moves out of contact with the switch, a circuit may be broken such that the light source 315 is deactivated. In some embodiments, the switch 311 may be configured to change the color of the light source 315 when the dogging indicator 300 is in the first position and change to an alternate color when the dogging indicator is in the second position. Any suitable switch may be employed for a light source, as the present disclosure is not so limited.

Figure 7:
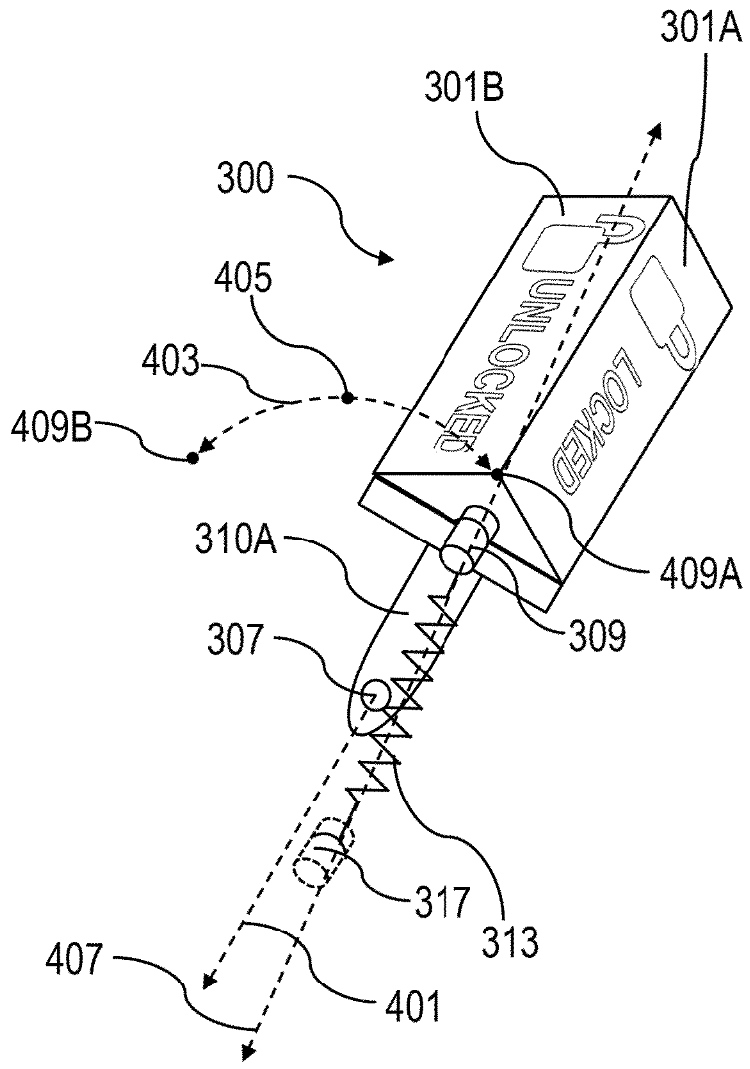
FIG. 7 is a schematic of one embodiment of a dogging indicator of a dogging mechanism.

FIG. 7 is a schematic of a dogging indicator 300 and spring 313. As shown in FIG. 7, the dogging indicator 300 is configured to pivot on a pivot axis 401 over a travel path 403 between a first position 409A and a second position 409B. The travel path 403 includes a midpoint 405 positioned midway between the first position 409A and the second position 409B. In some embodiments as shown in FIG. 7, the position of the dogging indicator 300 on the travel path 403 may be represented by a junction between a first face 301A and a second face 301B of the dogging indicator 300. In other embodiments, the position of the dogging indicator 300 on the travel path 403 may be represented by an indicator spring projection 309. In the embodiment of FIG. 7, the first position and second position are end stops of the travel path 403, such that the dogging indicator 300 is not able to pivot further than the first position and the second position. The first position and second position may be established by a housing containing the dogging indicator 300, in some embodiments. As shown in FIG. 7, the dogging indicator 300 includes a first arm 310A and a second arm 310B of the dogging indicator 300 provide a hinge 307 aligned with the pivot axis 401. In some embodiments, the first arm 310A and the second arm 310B extend perpendicularly to the pivot axis 401. In some embodiments, the first face 301A and the second face 301B of the dogging indicator 300 extend in a direction parallel to the pivot axis 401.

As shown in FIG. 7, the dogging indicator 300 is coupled to a spring 313 that is configured to bias the dogging indicator to either the first position 409A or the second position 409B depending on the position of the dogging indicator on the travel path 403. The spring of FIG. 7 extends between a housing spring projection 317 and the indicator spring projection 309 and applies a biasing force to the dogging indicator 300. The spring 313 is configured to bias the dogging indicator 300 towards the first position 409A when the dogging indicator 300 is disposed between midpoint 405 and the first position. The spring 313 is also configured to bias the dogging indicator 300 towards the second position 409B when the dogging indicator 300 is disposed between the midpoint 405 and the second position. The spring 313 may be a tension spring configured to apply a downward force to the dogging indicator relative to the page (e.g., a force toward a door when the dogging mechanism is installed on the door). Accordingly, when the dogging indicator is disposed on a side of the midpoint 405 toward the first position 409A, the downward force urges the dogging indicator to pivot toward the first position (e.g., clockwise). When the dogging indicator is disposed on a side of the midpoint 405 toward the second position 409B, the downward force from the spring 313 urged the dogging indicator to pivot toward the second position (e.g., counterclockwise). When the dogging indicator is positioned at the midpoint, the direction of force applied by the spring may be aligned through the pivot axis 401, such that no torque is applied to the dogging indicator to pivot the dogging indicator in either direction (toward the first position or second position). The spring 313 extends along a spring axis 407 perpendicular to the pivot axis 401. As the dogging indicator pivots between the first position and the second position, the spring axis 407 is configured to cross over the pivot axis 401. In the embodiment of FIG. 7, the spring axis 407 bisects the dogging indicator 300.

Figure 8A:
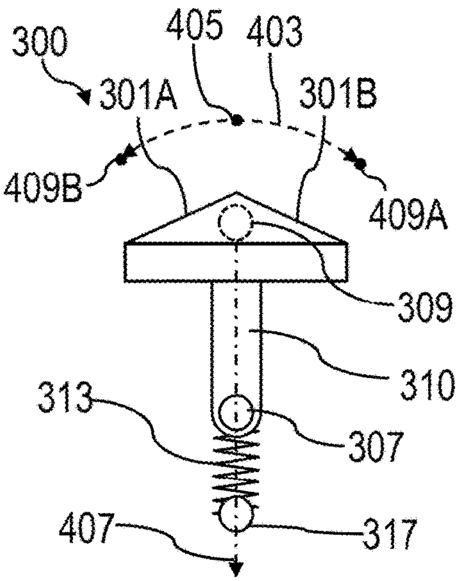
FIG. 8A is a schematic of one embodiment of a dogging indicator of a dogging mechanism in a first position.
Figure 8B:
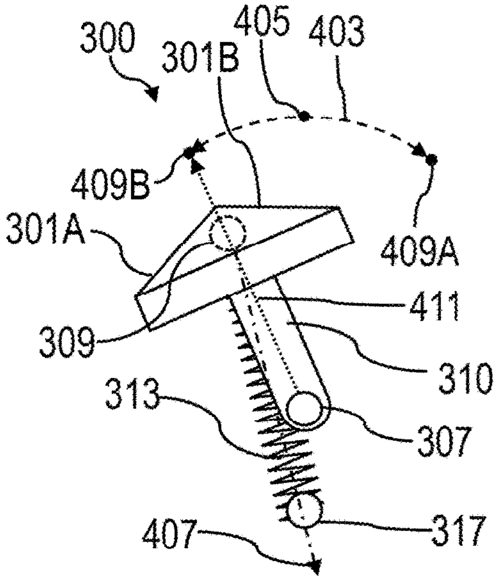
FIG. 8B is a schematic of the dogging indicator of FIG. 8A in a second position.
Figure 8C:
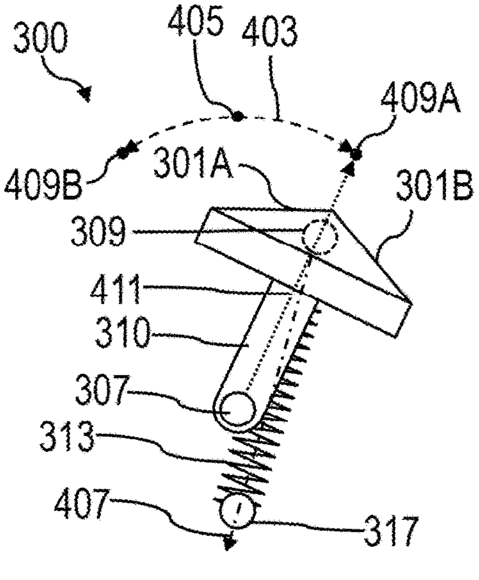
FIG. 8C is a schematic of the dogging indicator of FIG. 8A in a third position.

FIGS. 8A-8C depict a schematic of a dogging indicator 300 and spring 313 in various positions showing the change in biasing force applied by the spring, in some embodiments. As discussed previously, the dogging indicator may be configured to pivot about a pivot axis (aligned with an indicator hinge 307) between a first position 409A and a second position 409B on a travel path 403. When the dogging indicator 300 is in the first position 409A, a first face 301A of the dogging indicator may be aligned with a slot forming in a housing and/or rail of an exit device so that the first face is displayed externally. The first face may include a marking configured to indicate a first dogging status of a dogging mechanism (and correspondingly an exit device) associated with the dogging indicator being in the first position. When the dogging indicator 300 is in the second position 409B, a second face 301B of the dogging indicator may be aligned with a slot forming in a housing and/or rail of an exit device so that the second face is displayed externally. The second face may include a marking configured to indicate a second dogging status of a dogging mechanism (and correspondingly an exit device) associated with the dogging indicator being in the first position. The position of the dogging indicator 300 on the travel path 403 may be based on the direction of the one or more arms 310, as shown by dashed arrow 411 in FIGS. 8B and 8C. In some embodiments, the position of the dogging indicator 300 on the travel path 403 may be based on a position of a junction between the first face 301A and the second face 301B.

As shown in FIGS. 8A-8B, the spring 313 extends between an indicator spring projection 309 and a housing spring projection 317. The housing projection 317 may be stationary and associated with a housing of a dogging mechanism or a portion of an exit device rail. In contrast, the indicator spring projection 309 may move with the dogging indicator as the dogging indicator pivots between the first position 409A and the second position 409B. In some embodiments as shown in FIGS. 8A-8C, the spring 313 is a tension spring configured to apply a downward force relative to the page in the views shown in FIGS. 8A-8C (in an exit device, the force may be applied toward a door, in some embodiments). The spring 313 applies force along a spring axis 407, as shown by the dash-dot arrow. The dogging indicator 300 pivots about a pivot axis established by a hinge 307 formed in one or more arms 310 of the dogging indicator. The spring axis 407 may be perpendicular to the pivot axis of the dogging indicator. In the embodiment of FIGS. 8A-8C, the spring axis bisects the dogging indicator for all positions of the dogging indicator.

As shown in FIG. 8A, the dogging indicator 300 is positioned at a midpoint 405 of the travel path 403. When aligned with the midpoint, the spring axis 407 extends through a center of the hinge 307, such that the spring axis 407 intersects the pivot axis of the dogging indicator. As the spring 313 applies force along the spring axis 407, no torque is applied to the dogging indicator 300 to rotate the dogging indicator toward the first position 409A or the second position 409B. Accordingly, in the state shown in FIG. 8A, the dogging indicator is not biased to either the first position 409A or the second position 409B.

As shown in FIG. 8B, the dogging indicator 300 is positioned at the second position 409B. As shown in FIG. 8B, the spring axis 407 is disposed to the left of the hinge 307, such that the spring axis no longer intersects a pivot axis of the dogging indicator. As a result, the force applied along the spring axis 407 by the spring 313 applies a torque to the dogging indicator 300 that urges the dogging indicator into the second position 409B. As the second position 409B may be an end stop for the travel of the dogging indicator 300, the spring 313 may move the dogging indicator into the second position 409B and keep the dogging indicator there. As shown in FIG. 8B, the second face 301B is facing upward, and may be aligned with a slot formed in a dogging mechanism housing and/or an exit device rail.

As shown in FIG. 8C, the dogging indicator 300 is positioned at the first position 409A. As shown in FIG. 8C, the spring axis 407 is disposed to the right of the hinge 307, such that the spring axis does not intersects a pivot axis of the dogging indicator. Additionally, the spring axis 407 is disposed on an opposite side of the hinge 307 compared to the state shown in FIG. 8B. Between the positions shown in FIGS. 8B and 8C, the spring axis 407 crosses the pivot axis of the dogging indicator 300. As a result, the force applied along the spring axis 407 by the spring 313 applies a torque to the dogging indicator 300 that urges the dogging indicator into the first position 409A, in an opposite direction than the torque applied in state of FIG. 8B. As the first position 409A may be an end stop for the travel of the dogging indicator 300, the spring 313 may move the dogging indicator into the first position 409A and keep the dogging indicator there. As shown in FIG. 8C, the first face 301A is facing upward, and may be aligned with a slot formed in a dogging mechanism housing and/or an exit device rail.

It should be noted that while exemplary embodiments herein describe a midpoint with respect to a travel path, the midpoint is not required to be equidistant to the first position and the second position of a dogging indicator. Rather, the midpoint is a position of the dogging indicator where biasing force applied to the dogging indicator switches from urging the dogging indicator to rotate in a first direction toward the first position to urging the dogging indicator in a second direction opposite the first direction toward the second position. In some embodiments, the midpoint may be a position where no torque is applied to the dogging indicator biasing the dogging indicator to pivot in either a first direction or an opposite second direction. In some embodiments, a midpoint may be a position in which a spring axis intersects a pivot axis of the dogging indicator. In some embodiments, the midpoint may be equidistant to the first position and the second position on the travel path.

Figure 9:
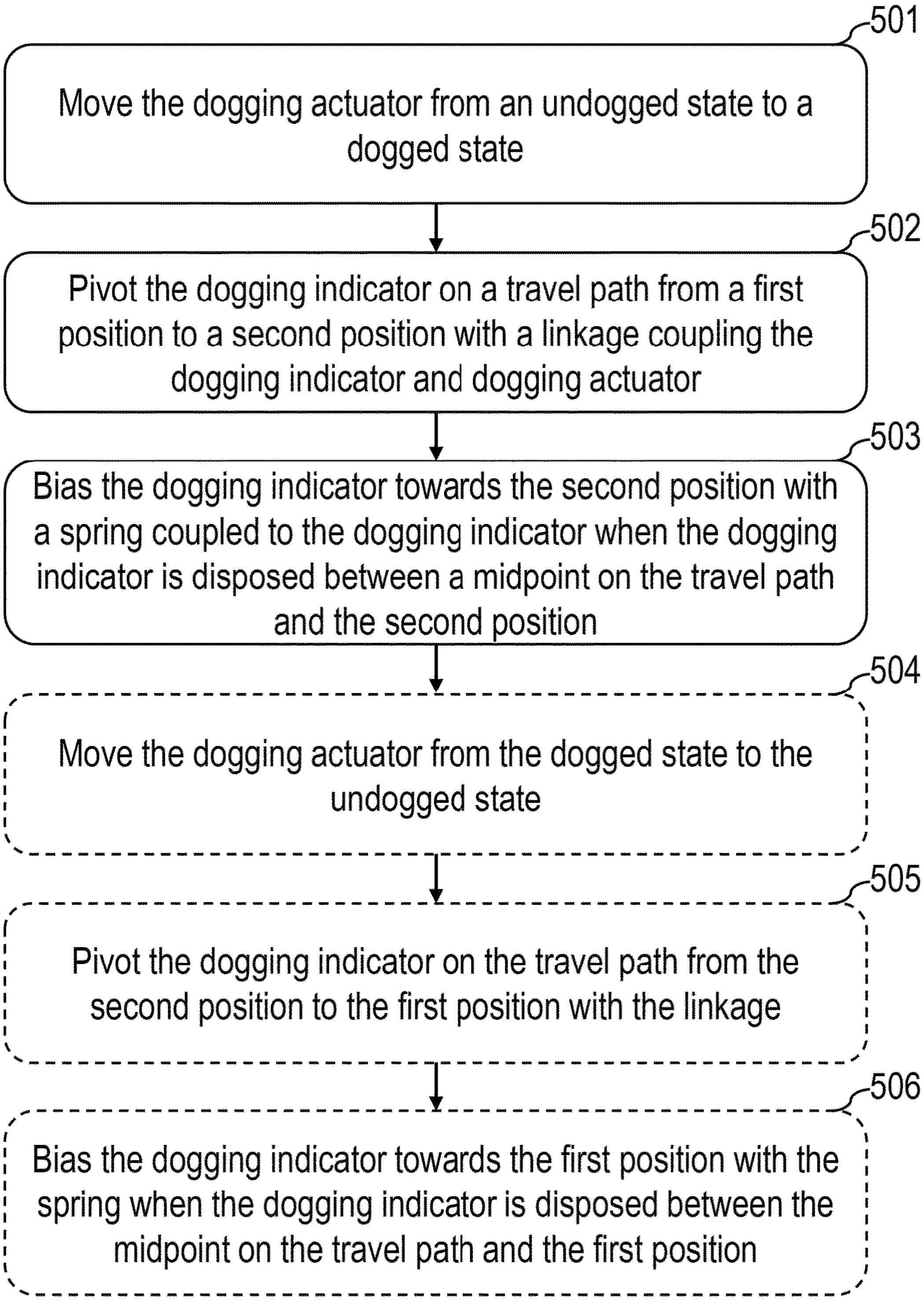
FIG. 9 is a flowchart for one embodiment of a method of operating a dogging mechanism.

FIG. 9 is a flowchart showing a method of operating a dogging mechanism. having a dogging indicator according to one illustrative embodiment. In block 501, the method may include moving a dogging actuator from an undogged state to a dogged state. In response to moving the dogging actuator to the dogged state, in block 502 the method may further include pivoting a dogging indicator on a travel path from a first position to a second position with a linkage coupling the dogging indicator and dogging actuator. The travel path may include a midpoint disposed between the first position and the second position. In block 503, the method may include biasing the dogging indicator towards the second position with a spring coupled to the dogging indicator when the dogging indicator is disposed between the midpoint and the second position. In optional block 504, the method may include moving the dogging actuator from the dogged state to the undogged state. In optional block 505, in response to the movement of the dogging actuator to the undogged state in block 504, the method may further include pivoting the dogging indicator on the travel path from the second position to the first position with the linkage. In optional block 506, the method may include biasing the dogging indicator toward the first position with the spring when the dogging indicator is disposed between the midpoint and the first position.

Figure 10:
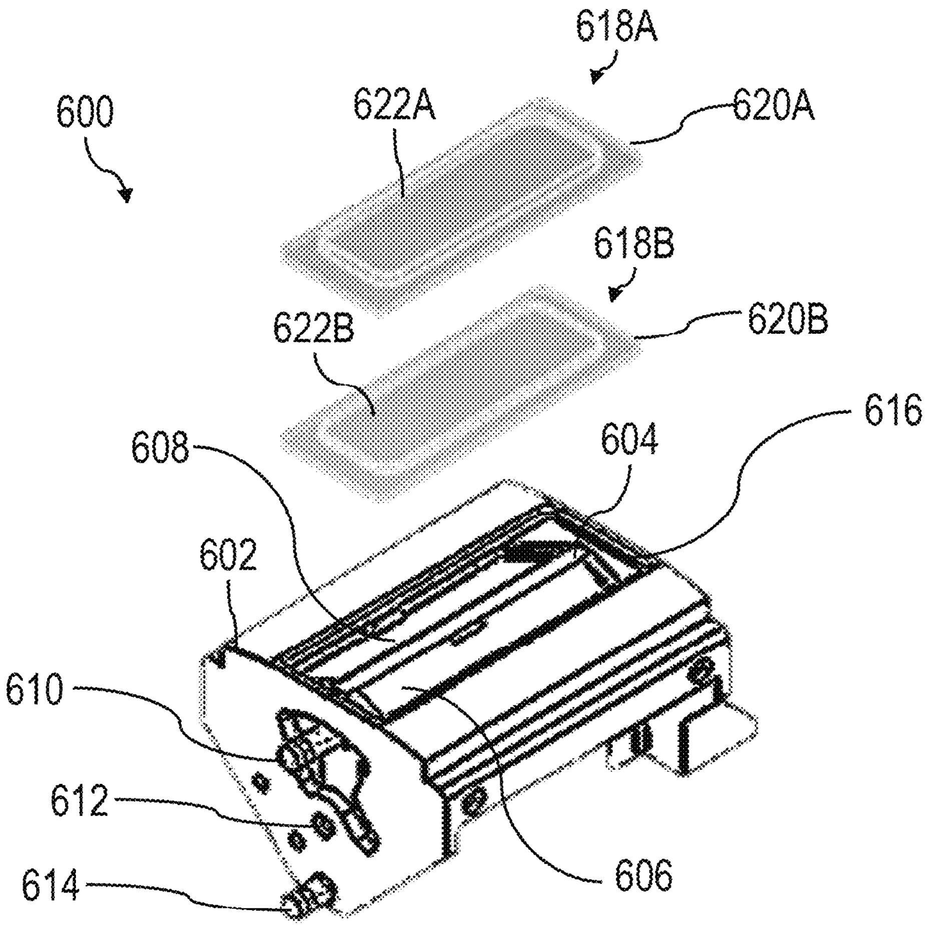
FIG. 10 depicts a perspective view of another embodiment of a dogging mechanism and interchangeable lenses.

FIG. 10 depicts a perspective view of another embodiment of a dogging mechanism 600 including a dogging indicator 604 and interchangeable lenses 620A, 620B. As shown in FIG. 10, the dogging mechanism 600 includes a dogging indicator housing 602. The dogging indicator housing houses the dogging indicator 604. The dogging indicator 604 is configured to pivot about an indicator hinge 612 between a first position and a second position, as described with reference to other exemplary embodiments herein. The dogging indicator 604 includes a first face 606 and a second face 608. One of the first face 606 and the second face 608 is configured to be displayed through a slot 616 formed in the dogging indicator housing 602 based on a state of the dogging mechanism 600. In some embodiments as shown in FIG. 10, the dogging indicator housing 602 includes a housing spring projection 614. The dogging indicator 604 includes an indicator spring projection 610. In some embodiments, a spring (not shown) is configured to be coupled between the housing spring projection 614 and the indicator spring projection 610 to apply a biasing force to the dogging indicator 604. An exemplary embodiment of a spring for a dogging indicator is described above with reference to FIGS. 8A-8C.

As shown in FIG. 10, the dogging mechanism 600 includes a plurality of lenses 618A, 618B. The lenses each include a base plate 620A, 620B and an insert 622A, 622B. The base plates 620A, 620B are configured to seat in the slot 616 formed in the indicator housing 602. The base plates 620A, 620B may have the same geometry for both lenses, as the slot 616 of the indicator housing 602 may have the same size regardless of exit device type, in some embodiments. The inserts 622A, 622B are configured to seat in a rail slot formed in an exit device rail or other housing. As shown in FIG. 10, a first lens 618A has a first insert 622A having a specific geometry configured to seat in a first type of exit device rail slot. A second lens 618B has a second insert 622B having a different geometry from the first insert 622A configured to seat in a second type of exit device rail slot. In some embodiments, the first insert 622A may differ from the second insert 622B in one or more of width, length, thickness, or curvature. Some exemplary geometries and differences are shown and described with reference to FIGS. 11-12. In some embodiments, the first lens 618A and the second lens 618B may be formed of a transparent material (e.g., glass, plastic, etc.). In some embodiments, a lens may provide magnification. While in the embodiment of FIG. 10 shows two lenses, in other embodiments any number of lenses maybe provided to allow a dogging indicator to be employed with a particular exit device type, as the present disclosure is not so limited.

Figure 11:
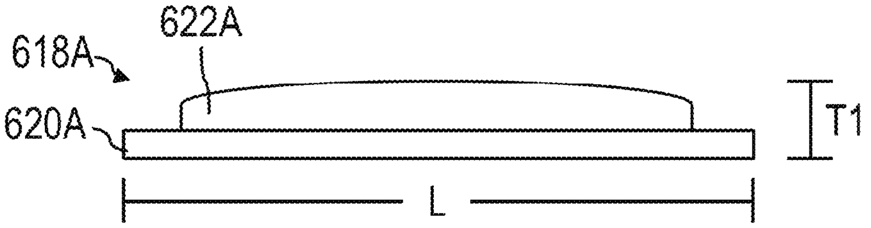
FIG. 11 depicts a side schematic of one embodiment of a lens for a dogging mechanism.

FIG. 11 depicts a side schematic of one embodiment of a lens 618A for a dogging indicator. As shown in FIG. 11, the lens 618A is a first type of lens. The lens 618A includes a base plate 620A and an insert 622A. As shown in FIG. 11, the lens 618A has an overall thickness T1, which represents a combined thickness of the base plate 620A thickness and the insert 622A thickness. The lens 618A also has an overall length L. The overall length of the lens 618A may be established by the length of the base plate 620A. That is, the insert 622A has a length less than that of the base plate 620A. In some embodiments, the lens 618A may have an overall width (measured perpendicular to both the length and thickness, for example into the page). In some embodiments, the overall width of the lens may be established by the base plate 620A, such that the insert 622A has a width less than that of the base plate. The base plate 620A may be configured to be received in a slot of an indicator housing. The insert 622A may be configured to be received in an exit device slot (e.g., formed in a rail or other housing). As shown in FIG. 11, the insert 622A may include a curved top surface. In some embodiments, the curvature of the top surface of the insert 622A may be configured to match the curvature of an exit device rail or other housing.

Figure 12:
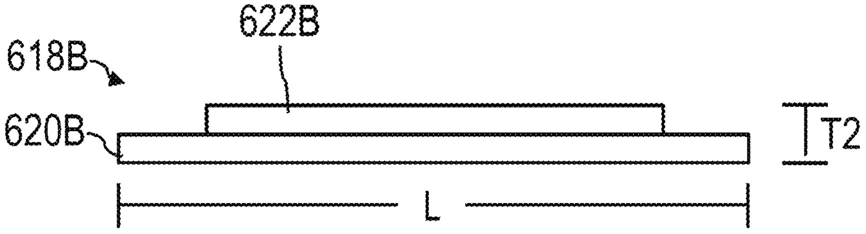
FIG. 12 depicts a side schematic of another embodiment of a lens for a dogging mechanism.

FIG. 12 depicts a side schematic of one embodiment of a lens 618B for a dogging indicator. As shown in FIG. 12, the lens 618B is a second type of lens different from the type of lens shown in the exemplary embodiment of FIG. 11. The lens 618B includes a base plate 620B and an insert 622B. As shown in FIG. 12, the lens 618B has an overall thickness T2, which represents a combined thickness of the base plate 620B thickness and the insert 622B thickness. The thickness T2 is less than thickness T1 of FIG. 11. The base plate 620B of the lens 618B has the same geometry as the base plate 620A of FIG. 11. Accordingly, the insert 622B of the lens 618B has a lesser thickness than the insert 622A of the lens 618A. The lens 618B also has an overall length L. Similar to the embodiment of FIG. 11, the overall length of the lens 618B may be established by the length of the base plate 620B. That is, the insert 622B has a length less than that of the base plate 620B. In some embodiments, the lens 618B may have an overall width (measured perpendicular to both the length and thickness, for example into the page). In some embodiments, the overall width of the lens 618B may be established by the base plate 620B, such that the insert 622B has a width less than that of the base plate. According to the embodiment of FIG. 12, the insert 622B has a length less than a length of the insert 622A of the lens 618A of FIG. 11. The base plate 620B may be configured to be received in a slot of an indicator housing. The insert 622B may be configured to be received in an exit device slot (e.g., formed in a rail or other housing). As shown in FIG. 12, the insert 622B may have a flat top surface.

While in the exemplary embodiments of FIGS. 11-12 inserts are shown in differ in thickness, length, and curvature, in other embodiments an insert of a lens type may differ from other inserts of different lens types by any singular characteristic or combination of characteristics. For example, an insert may be different in one or more of length, width, thickness, or curvature from other inserts, as the present disclosure is not so limited.

Figure 13:
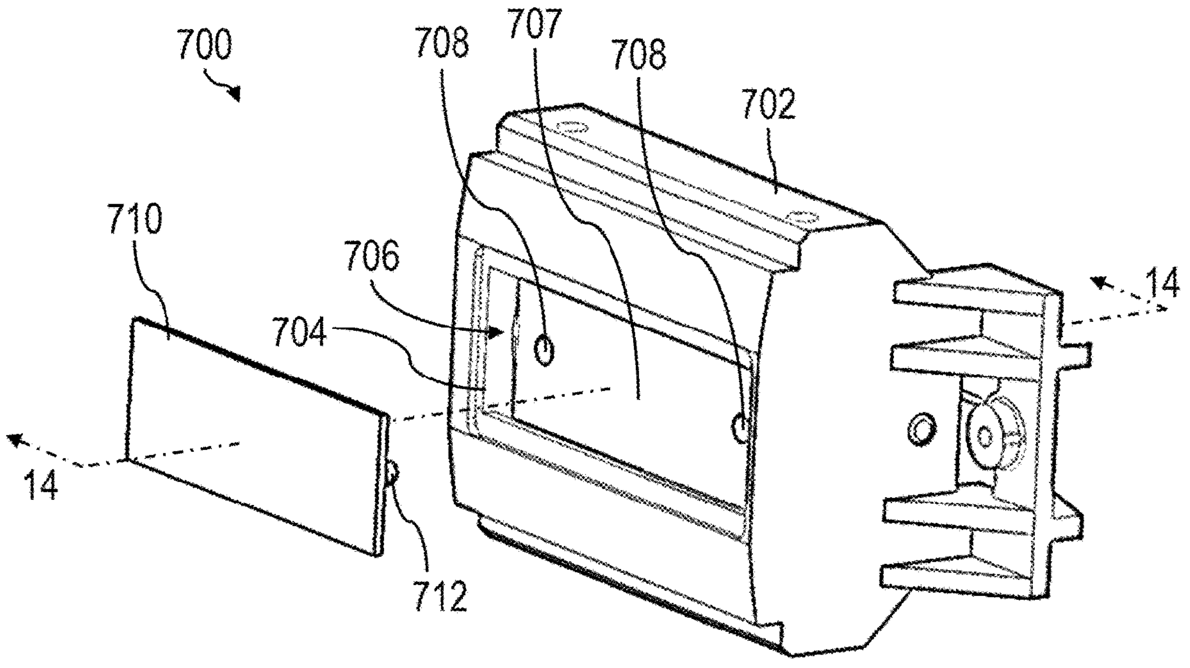
FIG. 13 depicts an exploded view of another embodiment of a dogging mechanism.

FIG. 13 depicts an exploded view of another embodiment of a dogging mechanism 700 including a dogging indicator 706. As shown in FIG. 13, the dogging mechanism includes a dogging indicator housing 702. The dogging indicator housing 702 is configured to house the dogging indicator 706. A slot 704 formed in the dogging indicator housing 702 is configured to align with a face 707 of the dogging indicator. A face 707 of the dogging indicator 706 being displayed through the slot 704 may correspond to a particular state of a dogging mechanism as described with reference to other exemplary embodiments herein.

As discussed previously, it may be desirable to provide a dogging indicator 706 including interchangeable label plates configured to be attached to a face 707 of the dogging indicator. As shown in FIG. 13, the dogging indicator 706 includes a label plate 710. The label plate 710 includes one or more fasteners 712 configured to engage one or more corresponding receptacles 708 formed in the face 707 of the dogging indicator 706. In the embodiment of FIG. 13, two fasteners 712 are employed with two receptacles 708. In some embodiments, the label plate 710 may be removable from the face 707 (e.g., the label plate 710 may be removably attached to the face 707). In some embodiments, the one or more fasteners 712 may include snap-fit fasteners. In other embodiments, other removable or non-removable fasteners may be employed singularly or in any combination, including, but not limited to, screws, adhesives, and magnets.

Figure 14:
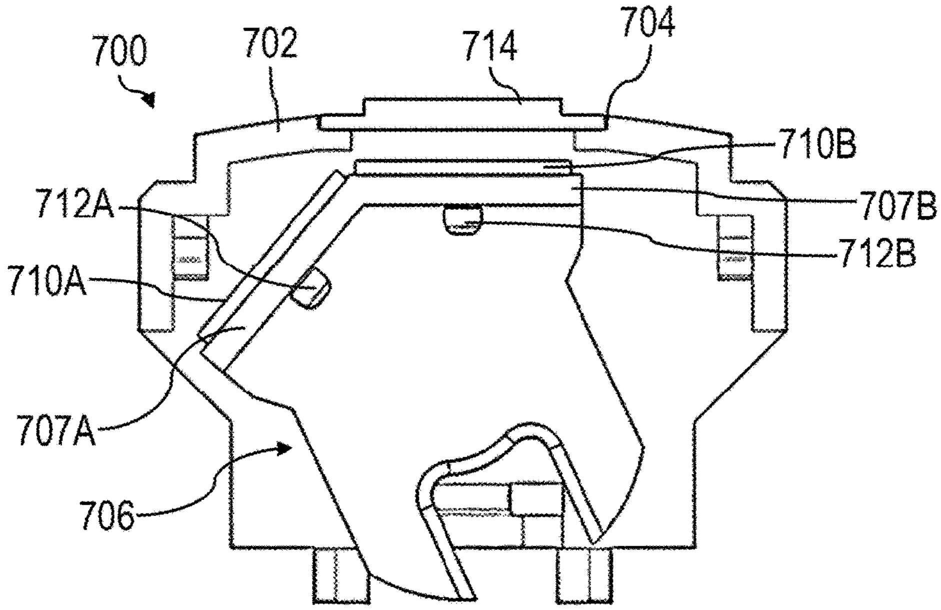
FIG. 14 depicts a cross-sectional view of the dogging mechanism of FIG. 13 taken along line 14-14.

FIG. 14 depicts a cross-sectional view of the dogging indicator housing 702 and dogging indicator 706 of FIG. 13 taken along line 14-14. As shown in FIG. 14, the dogging indicator 706 is disposed within the dogging indicator housing 702 and is configured to pivot between a first position and a second position. Depending on the position of the dogging indicator 706 in either the first position or the second position, a first face 707A or a second face 707B will be aligned with the slot 704 formed in the dogging indicator housing 702, respectively. The alignment of the first face 707A or the second face 707B may correspond to a particular status of a dogging indicator. As shown in FIG. 14, in some embodiments a dogging indicator housing may include a lens 714 configured to seat in the slot 704. Some exemplary embodiments of lenses are described herein with reference to FIGS. 10-12.

As shown in FIG. 14, the dogging indicator 706 includes a first label plate 710A and a second label plate 710B. The first label plate may be configured to attach to the first face 707A. In some embodiments as shown in FIG. 14, a first fastener 712A is configured to extend through the first face 707A to attach the first label plate 710A to the first face. In the embodiment of FIG. 14, the first fastener 712A may be a snap fit fastener configured to expand once a distal portion of the first fastener passes through the first face 707A. The second label plate may be configured to attach to the second face 707B. Like the first label plate 710A, the second label plate 710 includes a second fastener 712B. The second fastener 712B is configured to extend through the second face 707B to attach the second label plate 710B to the second face 707B. In the embodiment of FIG. 14, the second fastener 712A may be a snap fit fastener configured to expand once a distal portion of the second fastener passes through the second face 707B. In some embodiments, the first label plate 710A and the second label plate 710B are configured to removably attach to the dogging indicator 706. In other embodiments, other removable or non-removable fasteners may be employed singularly or in any combination, including, but not limited to, screws, adhesives, and magnets. In some embodiments, the first label plate 710A and the second label plate 710B may be interchangeable, such that both the first label plate and the second label plate may be coupled to either the first face 707A or the second face 707B.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A dogging mechanism for an exit device, comprising:

a dogging indicator configured to pivot about a pivot axis over a travel path between a first position and a second position, wherein the travel path comprises a midpoint between the first position and the second position;

a dogging actuator, wherein the dogging actuator is configured to move between a dogged state and an undogged state;

a linkage coupled to the dogging indicator and the dogging actuator, wherein the linkage is configured to pivot the dogging indicator to the first position when the dogging actuator is moved into the undogged state, and wherein the linkage is configured to pivot the dogging indicator to the second position when the dogging actuator is moved into the dogged state; and a spring coupled to the dogging indicator, wherein the spring is configured to bias the dogging indicator towards the first position when the dogging indicator is positioned on the travel path between the midpoint and the first position, and wherein the spring is configured to bias the dogging indicator towards the second position when the dogging indicator is positioned on the travel path between the midpoint and the second position.

2. The dogging mechanism of claim 1, wherein the first position and the second position are end stops of the travel path.

3. The dogging mechanism of claim 1, wherein the dogging indicator has two faces, wherein the two faces are disposed at an angle relative to one another.

4. The dogging mechanism of claim 3, wherein the two faces are adjacent to one another.

5. The dogging mechanism of claim 3, wherein the two faces are parallel to the pivot axis.

6. The dogging mechanism of claim 5, wherein the dogging indicator comprises two arms extending from the two faces that provide the pivot axis and extend perpendicularly to the pivot axis.

7. The dogging mechanism of claim 3, further comprising a housing, wherein the dogging indicator is disposed at least partially within the housing, wherein the housing has a slot that is configured to show a first face of the two faces through the slot when the dogging indicator is disposed in the first position, and wherein the slot is configured to show a second face of the two faces through the slot when the dogging indicator is disposed in the second position.

8. The dogging mechanism, of claim 7, further comprising a lens seated in the slot.

9. The dogging mechanism of claim 1, further comprising a housing, wherein the dogging indicator is disposed at least partially within the housing, and wherein the linkage is pivotally coupled to the housing.

10. The dogging mechanism of claim 1, wherein the dogging actuator is configured to hold a push bar of the exit device in a retracted position when the dogging actuator is in the dogged state.

11. The dogging mechanism of claim 1, further comprising a light source that is configured to illuminate the dogging indicator.

12. The dogging mechanism of claim 11, further comprising a switch that is configured to activate the light source when the dogging indicator is in the first position, and wherein the switch is configured to deactivate the light source when the dogging indicator is in the second position.

13. The dogging mechanism of claim 1, wherein the dogging indicator comprises a spring projection extending parallel to the pivot axis, wherein the spring is attached to the spring projection.

14. The dogging mechanism of claim 1, wherein the spring extends along a spring axis perpendicular to the pivot axis, wherein the spring axis is configured to cross the pivot axis when the dogging indicator is moved from the first position to the second position.

15. The dogging mechanism of claim 14, wherein the spring axis bisects the dogging indicator.

16. The dogging mechanism of claim 1, wherein the spring is a tension spring.

17. The dogging mechanism of claim 1, wherein the dogging indicator further comprises a first label plate configured to attach to a first face of the dogging indicator and a second label plate configured to attach to a second face of the dogging indicator.

18. The dogging mechanism of claim 17, wherein the first label plate is further configured to attach to the second face, and wherein the second label plate is further configured to attach to the first face.

* * * * *